United States Patent [19]

Bains

[11] Patent Number: 4,475,896
[45] Date of Patent: Oct. 9, 1984

[54] CURLING/DECURLING METHOD AND MECHANISM

[75] Inventor: Sudarshan S. Bains, Pittsford, N.Y.

[73] Assignee: Xerox Corporation, Stamford, Conn.

[21] Appl. No.: 326,722

[22] Filed: Dec. 2, 1981

[51] Int. Cl.³ .............................................. B31F 7/00
[52] U.S. Cl. ..................................... 493/454; 162/271
[58] Field of Search ............... 493/454, 459; 271/272, 271/273, 274, 314; 156/555, 272; 162/270, 271; 72/226

[56] References Cited

U.S. PATENT DOCUMENTS

| | | | |
|---|---|---|---|
| 1,969,073 | 8/1934 | Hamre | 92/70 |
| 2,012,953 | 9/1935 | Brunner et al. | 92/70 |
| 2,719,562 | 10/1955 | Beegle | 153/54 |
| 3,496,698 | 2/1970 | Wichmann | 53/117 |
| 3,971,696 | 7/1976 | Manfredi | 493/459 X |
| 4,360,356 | 11/1982 | Hall | 493/459 |

Primary Examiner—Robert L. Spruill
Assistant Examiner—Donald R. Studebaker
Attorney, Agent, or Firm—Bernard A. Chiama

[57] ABSTRACT

A sheet curling/decurling mechanism is disclosed as having a compliant roller with a soft, pliable material therearound, a curling roller forming a penetration nip with the compliant roller, the penetration nip being adapted to curl sheets of paper passing through the nip, and movable plates arranged adjacent the sheet exiting side of the nip for controlling the angle of exiting of the sheets from the nip.

5 Claims, 5 Drawing Figures

CURLING/DECURLING METHOD AND MECHANISM

With the advent of high speed copy reproduction machines, such as xerographic copiers, the need for devices to stack, collate, staple and/or bind the finished output has become increasingly apparent. However, due to the processing steps in reproduction machines, the copy sheets produced by a machine have a curl induced therein by the machine which prevents or seriously hampers proper stacking or collating of the copy machine output. In a xerographic machine of the type wherein a powdered toner image is transferred to the copy sheet and thereafter fused thereto, the application of heat to the image side of the sheet to fuse the toner thereon dries the moisture from one side of the copy sheet. The difference in moisture level between one side of the copy sheet and the other side produces substantial differences in curl in a great variety of copy sheets, particularly those having a high moisture content due to storage at high ambient humidity levels in the copy machine or in the room adjacent the copy machine. Furthermore, for the same ambient conditions and heat output of a fuser apparatus, curl differences will result in accordance with the weight of the copy paper.

While many devices have been utilized in the past to straighten web-like sheet material or bar stock, the problems of feeding individual cut sheets through decurling mechanisms, which mechanisms must of necessity be adjustable to compensate for varying sheet curl depending upon ambient conditions and sheet characteristics have produced numerous jams and presented great difficulties in obtaining the exact amount of straightening necessary due to the variable curl encountered from day to day and from the use of various papers having different curl characteristics.

In U.S. Pat. No. 1,969,073, a sheet straightening mechanism is disclosed as having two sets of belts and coacting rollers between which sheets are conveyed. In this arrangement sheets are corrugated for flattening the sheets. In U.S. Pat. No. 2,012,953, a rather complex decurling mechanism is disclosed so as to suject each sheet to curl alternatively in opposite directions. Different size rollers are used to vary the amount of decurling. One adjustable metal forming mechanism is disclosed in U.S. Pat. No. 2,719,562 and comprises a large soft roller and a smaller radius metallic roller embedded within the soft periphery of the large roller. Mechanism is also provided to vary the depth of penetration of the smaller roller to vary the amount of curl to be induced upon a sheet of metal going through the mechanism. However, in this arrangement of a curling mechanism, there is no provision for decurling sheet material in the event the mechanism has be adjusted for one particular sheet thickness or strength and another sheet of different thickness or strength has been applied. While the invention has been described for use in an environment such as a copier or duplicator for decurling copy sheets, the invention also has use in sheet curling arrangements wherein metallic sheets are curled into curved pipes and the like.

Therefore, it is the principle object of the present invention to permit the more accurate control of the curling or decurling of sheets.

It is another object of the present invention to control the curling or decurling of sheets more readily and with a minimum of parts and operative steps.

The invention combines a decurling apparatus having a large diameter roller with a pliable surface and a small diameter hard roller arranged to form a nip which penetrates the larger roller. Sheets of paper are conveyed through the nip for decurling. The combination includes sheet guiding plates on the exit side of the nip and means for pivoting the platen in unison for controlling the angle at which sheets exit the apparatus thereby controlling the amount of decurling. Though the present invention is illustrated and described to be immediately downstream of a copier fusing apparatus, the decurling apparatus of the present invention may be utilized at any point along a paper path whereat decurling is appropriate.

For a better understanding of the invention and further features thereof, reference is made to the following detailed description of the invention to be read in connection with the accompanying drawings wherein.

Figure 1:
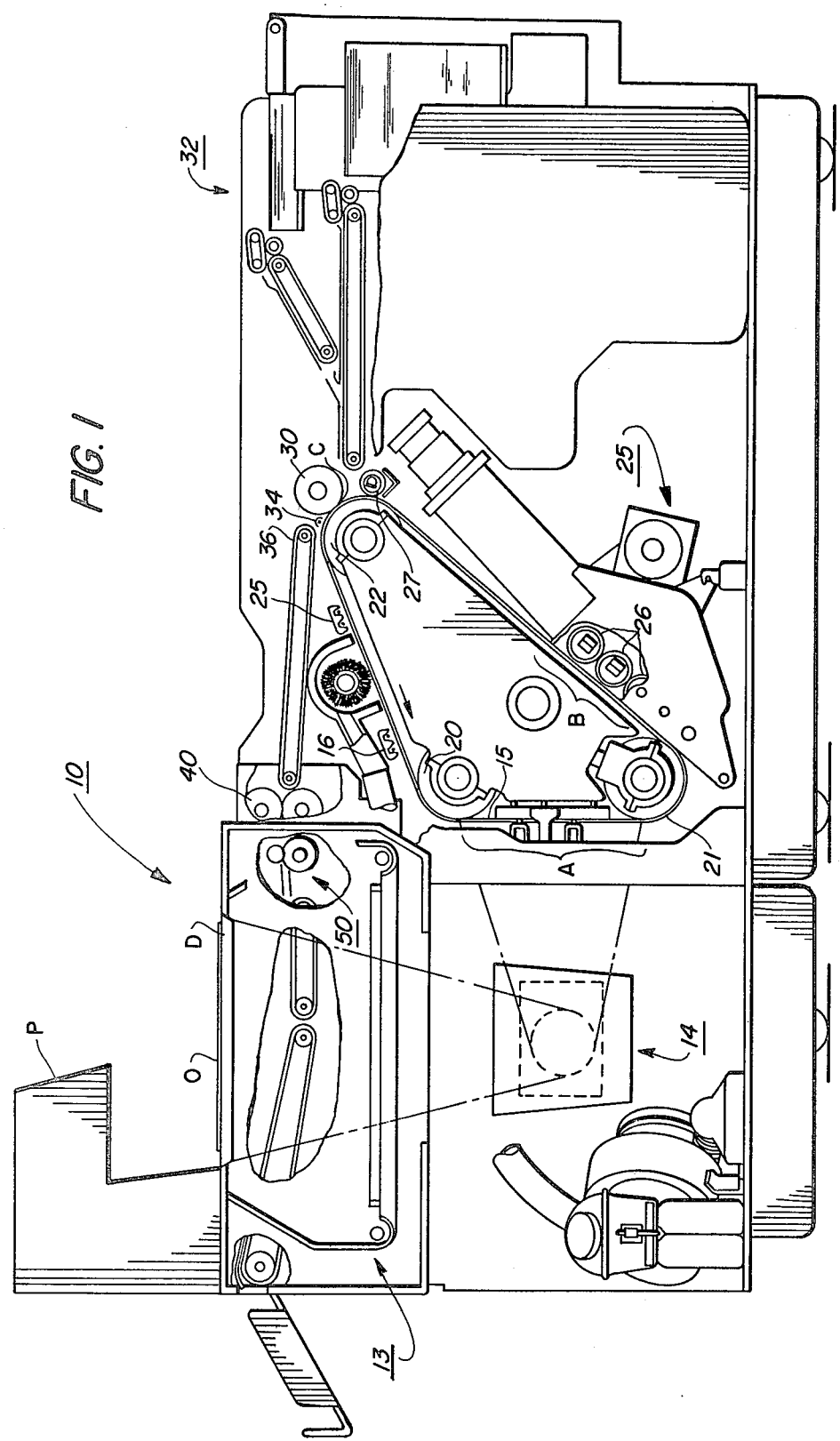
FIG. 1 illustrates a xerographic reproduction machine employing the sheet curling or decurling mechanism of the present invention.

For a general understanding of an electrostatic processing system 10 in which the invention may be incorporated as a typical application, reference may be made to FIG. 1. As in all electrostatic systems such as a xerographic machine of the type illustrated, a light image of an original to be reproduced is projected onto the sensitized surface of a xerographic plate to form an electrostatic latent image thereon. Thereafter, the latent image is developed with an oppositely charged developing material comprising carrier beads and smaller toner particles triboelectrically adhering thereto to form a xerographic powder image corresponding to the latent image on the plate surface. The powder image is then electrostatically transferred to a support surface to which it may be fixed by a fusing device whereby the tone image is caused permanently to adhere to the support surface.

In the illustrated machine, an original O to be copied is placed upon a transparent support platen D fixedly arranged in an illumination assembly generally indicated by the reference numeral 13. While upon the platen, an illumination system 13 flashes light rays upon the original, thereby producing image rays corresponding to the informational areas on the original. The image rays are projected by means of an optical system 14 to an exposure station A for exposing the photosensitive surface of a moving xerographic plate in the form of a flexible, endless photoconductive belt 15. In moving in the direction indicated by the arrow prior to reaching the exposure station A, that portion of the belt being exposed would have been uniformly charged by a corona device 16 located at a belt run extending between belt supporting rollers 20, 21 and 22. The exposure station extends between the roller 20 and the roller 21.

The exposure of the belt surface to the light image discharges the photoconductive layer in the areas struck by light, whereby there remains on the belt a latent electrostatic image in image configuration corresponding to the light image projected from the original on the supporting platen. As the belt surface continues its movement, the electrostatic image passes around the roller 21 and through the developing station B located at a third run of the belt and in which there is positioned a developing apparatus generally indicated by the reference numeral 25. The developing apparatus 25 comprises a plurality of magnetic brushes 26 which carry developing material to the adjacent surface of the upwardly moving inclined photoconductive belt 15. As the developing material is applied to the xerographic belt, toner particles in the development material are attracted electrostatically to the belt surface to form powder images.

The developed electrostatic image is transported by the belt 15 to a transfer station C located at a point of tangency on the belt as it moves around the roller 22 whereat a sheet of copy paper is moved at a speed in synchronism with the moving belt in order to accomplish transfer of the developed image. There is provided at this station a transfer roller 30 which is arranged on the frame of the machine for contacting the non-transfer side of each sheet of copy paper as the same is brought into transfer engagement with the belt 15. The roller 30 is electrically biased with sufficient voltage so that a developed image on the belt may be electrostatically transferred to the adjacent side of a sheet of paper as the same is brought into contact therewith.

There is also provided a suitable sheet transport mechanism adapted to transport sheets of paper seriatim from a paper handling mechanism generally indicated by the reference numeral 32 to the developed image on the belt as the same is carried around the roller 22. A programmer P operatively connected to the mechanism 32 and the illumination device for producing an electrostatic latent image on the belt 15 is effective to present a developed image at the transfer station C in timed sequence with the arrival of a sheet of paper.

As the sheet emerges from the transfer roller, it is detacked by a corona discharge device 34. The sheet is thereafter retained with the toner image inverted on the underside of a transport mechanism 36 by suitable means such as vacuum for movement into a fuser assembly generally indicated by the reference numeral 40 wherein the developed and transferred xerographic toner image on the sheet is permanently affixed thereto. After fusing, the finished copy is passed through a curling/decurling mechanism 50, to be more fully explained hereinafter and is discharged by way of transports from the apparatus at a suitable point for collection externally of the apparatus.

The curling/decurling mechanism 50 comprises a lower roller 60 having a thick sleeve member 61 made from pliable elastomer material surrounding a metallic supporting shaft 62. Positioned above the roller 60 is a curling or decurling roller 63 of smaller radius made from metallic material and having its periphery slightly embedded within the periphery of the pliable material of the sleeve 61, to form a pinch nip therewith. The axes of the rollers 60, 63 are parallel to each other and the distance between the same may be varied in order to vary the curling ability of the roller 63 and permit a formation of a pinch nip best suited for weight of the copy sheets and the materials used in the formation of the rollers. The penetration nip formed in the periphery of the roller 60 is such that the distance between the axes of the rollers 60, 63 is less than the sum of the diameter of these rollers.

Figure 5:
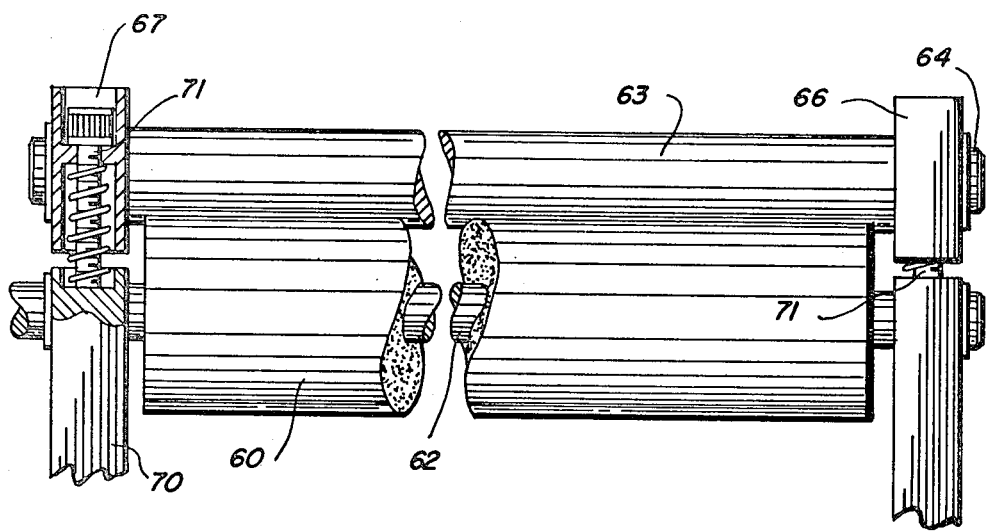
FIG. 5 illustrates the curling or decurling mechanism relative to the frame of the machine and a detail thereof.

As shown in FIG. 5, the extended shaft 64 for the curling roller 63, which is driven by the frictional engagement with the roller 60, is arranged to be adjustably positioned relative to the roller 60 to vary the pinch therebetween and thereby the decurling ability. For this purpose then, each end of the shaft 64 is notably mounted in an adjusting block 66, 67, which in turn are adjustably mounted upon the frame 70 of the machine above the ends of the shaft 62. A threaded element 71 associated with each of the blocks 66, 67 permits operator adjustment of the curling roller 63 relative to the axis of the roller 60 for varying the curling pinch therebetween. Any other suitable adjusting means may be employed for this purpose. Once a pinch nip has been selected as the most satisfactory for the materials and copy sheets to be utilized, the roller 63 should then be fixed. The selected pinch should be effective for decurling sheets at approximately the medium weight of the range of paper to be utilized. This selection however must be in conjunction with the temperature of the fuser apparatus, and the moisture content of the copy sheets. The pinch nip may be varied using the adjusting blocks 66, 67 for small changes in paper curl entering the curling mechanism. However, a nip that is too deep and which involves too great a pressure between the coacting rollers may adversely affect the copy sheet by crimping the same or in smearing an image on the sheet caused by the relative speed differential of the peripheries of the rollers. As will be described below, curling may be controlled for various curl conditions by means which will not adversely affect copy sheets.

The curling/decurling mechanism includes an exit baffle having an upper planar sheet guide 73 and a lower planar sheet guide 74 on the exit side of the penetration nip for guiding a sheet S from the mechanism. The guides are flat, and closely spaced from each other in parallel relationship. The upper guide plate 73 is arranged for pivoting at one edge 75 closely adjacent the roller 63 and above the pinch nip. Similarly, the lower guide plate 74 is arranged for pivoting at one edge 76, closely adjacent the roller 60 and below the pinch nip. These guides may be pivoted slightly in a vertical plane in either direction for a purpose to be described below. To this end, an adjusting device 77 is connected to the guides for effecting pivoting thereof in unison. The device 77 may comprise a rack 78 and coacting pinion 79 for effecting the angular adjustment of the guides 73, 74. A manually operable knob 80 may be used in conjunction with the pinion to permit operator adjustment. Any other suitable means such as a solenoid or electrical reversible motor may be utilized for imparting the angular variations to the guide plates.

Figure 2:
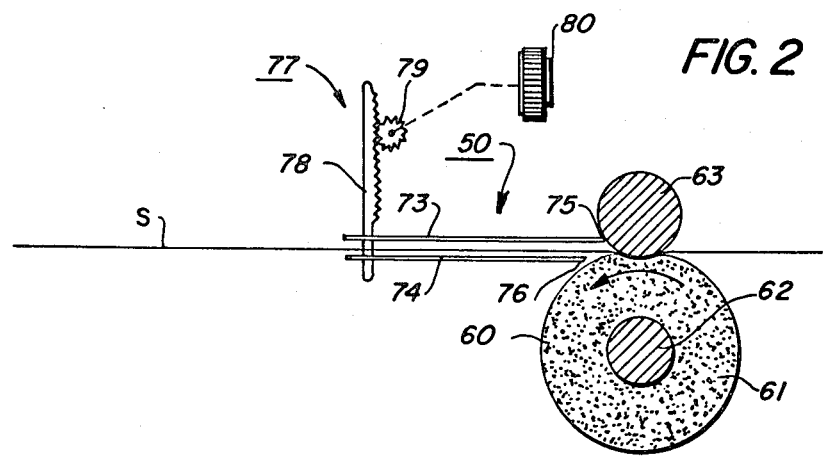
FIG. 2 illustrates the sheet curling or decurling mechanism of the present invention in one condition of operation for decurling sheets having slight curl.

As shown in FIG. 2, the guide plates 73, 74 are positioned in their normal operating position for directing copy sheets out of the curling mechanism in the same general horizontal plane as the sheets occupy when entering the mechanism. Assuming the curl on the copy sheet exiting the fuser apparatus 40 is such that the pinch or decurling roll penetration is adequate to decurl the same, the angular positioning of the guide plates 73, 74 will be as indicated in FIG. 2, that is, generally in a horizontal plane. The guides then will direct the flow of copy sheets upon the transport 51. However, if the nip penetration between the rollers 60, 63 is not set for a particular curl condition of the paper sheet entering the curling apparatus, the angle of the guide plates 73, 74 may be varied upwardly or downwardly relative to the horizontal plane to either increase or decrease the decurling action, respectively, and to the amount as the situation requires.

Figure 3:
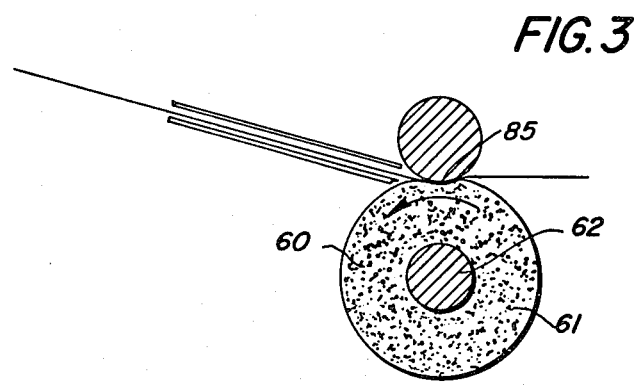
FIGS. 3 and 4 illustrate the sheet curling or decurling mechanism of the present invention in other conditions of operation for decurling sheets having a high degree of curl, or low degree of curl, respectively.
Figure 4:
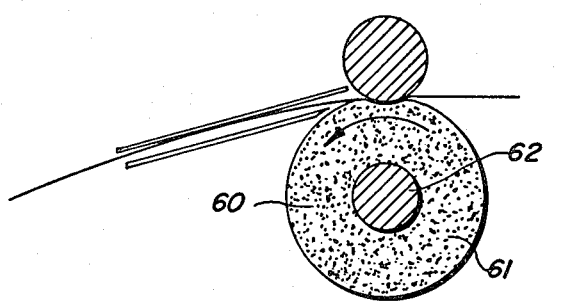

The exit baffle comprising the guides 73, 74 and being adjustable may be utilized alone for controlling curling-/decurling or in conjunction with the adjustable mechanism of FIG. 5, by allowing copy sheets to exit horizontally, as shown in FIG. 2, to move upwardly to make the sheet slightly wrap around the curling roller 63 for additional bending or decurling of paper as shown in FIG. 3, or to move downwardly to make the sheet bend slightly in the reverse direction to decrease the decurling action or induce curling action, as shown in FIG. 5. Such bending in the reverse direction is effective along a line indicated at 85 extending axially of the roller 60 at the portion of the periphery thereof immediately after the pinch nip. Undesirable over-bending by the curling roller 63 may also be counteracted if the sheet is held in a straight through attitude with the exit baffle as will be the case with the exit baffle in the position as shown in FIG. 2.

The undesirable over-bending or excessive decurling referred to above is that normally less bending or reduced decurler roll penetration is generally required to decurl a heavyweight paper with the same curl as a lightweight paper. Therefore, if the pinch or curler roller penetration is set for decurling lightweight papers and heavy paper is run through the curling mechanism, there may be over-decurling, or curl in the reverse direction will be induced. But if the sheet is constrained in a straight through attitude as it exits the mechanism, the secondary bending is effective along the line 85. The portion 85 has a radius of curvature shorter than that of the roller 60. The secondary bending is in the reverse direction as that produced by the decurler penetration and counteracts the excessive decurling in the nip.

From the foregoing description, it will be appreciated that the curling/decurling apparatus is adapted to accommodate a wide variety of input curl by (1) varying exit baffle angle and (2) combining the variation of both the nip penetration and the exit baffle angle. It will also be appreciated that the curling/decurling apparatus is also adapted to receive flat, uncurled metallic sheets and to control the amount of curl to the sheets in accordance with the angle of the exit baffle plates below the horizontal plane so as to control the amount of bending along the line 85. Sheets entering the curling/decurling apparatus with a curl in a direction to be decurled by the roller 63 may exit the apparatus with a curl greater that when entering and in the same direction of curl by the proper angular displacement of the exit baffle.

While the invention has been described with reference to the structure disclosed, it is not confined to the details set forth, but is intended to cover such modifications or changes as may come within the scope of the following claims.

I claim:

1. A sheet curling mechanism comprising:
   means supplying individual cut sheets
   a compliant roller having a soft, pliable material therearound,
   a curling roller having a radius of curvature smaller that that of said compliant roller and arranged in parallel therewith, said curling roller having a non-compliant surface and arranged to form a penetration nip with said compliant roller, said penetration nip being adapted to decurl the individual cut sheets having a curl impressed thereon and passing therethrough,
   guide means arranged adjacent the sheet exiting side of said nip for directing the angle of exiting of the sheets from said nip, and
   means for varying the orientation of said guide means for varying the angle of exiting of the sheets thereby controlling the amount of wrap of the sheets relative to said curling roller.

2. The sheet curling apparatus of claim 1 wherein said guide means includes a pair of closely-spaced, parallel plates between which sheets are moved.

3. A sheet curling mechanism comprising:
   means supplying individual cut sheets
   a compliant roller having a soft, pliable material therearound,
   a curling roller having a radius of curvature smaller than that of said compliant roller and arranged in parallel therewith, said curling roller having a non-compliant surface and arranged to penetrate the surface of said compliant roller to form a pinch nip and a portion of the periphery of the compliant roller with a radius smaller than the radius of said curling roller on the exit side of said nip, said nip being adapted to decurl the individual cut sheets having a curl impressed thereon and passing therethrough, and
   movable guide means arranged adjacent the sheet exiting side of said nip for controlling the angle at which sheets are applied to said curved portion for varying reverse decurling of the sheets.

4. The method of curling sheets in a curling mechanism having a curling roller with a non-compliant surface and a compliant roller having a radius larger than that of the curling roller, the latter roller being arranged in parallel with the curling roller penetrating the surface of the compliant roller to form a penetration nip therewith through which individual cut sheets are directed for curling the same, comprising the steps of supplying individual cut sheets to the penetration nip, and:
   controlling the angle of the sheets exiting the penetration nip thereby varying the amount of wrap of the sheets relative to the curling roller, in accordance with the amount of curling resulting from the sheets passing through the penetration nip.

5. The method of curling sheets of paper in a curling mechanism having a curling roller with a non-compliant surface and a compliant roller having a radius larger than that of the curling roller, the latter roller being arranged in parallel with the curling roller pentrating the surface of the compliant roller to form a penetration nip therewith through which individual cut sheets to the penetration nip and sheets are directed for curling the same, comprising the steps of:
   varying the depth of the penetration nip and forming a portion of the periphery of the compliant roller with a smaller radius than the radius of the curling roller on the exit side of the nip, and
   controlling the angle of the sheets exiting the penetration nip thereby varying the application of the sheets relative to said portion in accordance with the amount of curling resulting from the sheets passing through the penetration nip.

* * * * *